UNITED STATES PATENT OFFICE.

ALEXANDRE ETARD, OF PARIS, FRANCE.

METHOD OF TREATING ORES CONTAINING GOLD, SILVER, OR COPPER.

SPECIFICATION forming part of Letters Patent No. 601,640, dated April 5, 1898.

Application filed May 8, 1897. Serial No. 635,719. (No specimens.)

*To all whom it may concern:*

Be it known that I, ALEXANDRE ETARD, doctor of science, a citizen of the French Republic, residing at 14 Rue Monsieur le Prince, Paris, in the Republic of France, have invented certain improvements in the treatment of ores or other matters containing gold, silver, or copper for the obtainment of the metal therefrom, of which the following is a specification.

In treating ores or other matters containing gold, silver, or copper a solution of hydrochloric acid in water containing a very small proportion of ordinary hydrochloric acid per cubic meter—say thirty kilograms or thereabout—does not noticeably affect the gold or other metal, and solutions of permanganate of potash or of other manganate or permanganate do not affect it much; but I have discovered that if there be added to such a cold hydrochloric-acid solution a small amount of a manganate or permanganate of an alkali metal or of an alkali-earth metal or a chlorate or perchlorate of an alkali metal or of an alkali-earth metal or an alkali metal chromate or bichromate—say, for example, about four hundred or five hundred grams of permanganate of potash (or of the other alkaline compound selected) per cubic meter of a two or three per cent. hydrochloric-acid solution—a liquid is obtained which is devoid of odor of chlorin and is capable of dissolving gold, silver or copper very rapidly, and is suitable for the chlorination of gold, silver, or copper ore or matter containing such metals by washing or lixiviation. Care should be taken not to use too highly concentrated solutions of hydrochloric acid and manganate or permanganate or other alkaline compound used, as then chlorin is produced. When dilute solutions are used, they form a mixture that is stable during the time needed for performing a series of methodical filtrations upon the ore or matter to be treated. If chlorination be properly effected, not by chlorin or chlorinated water, but by the simultaneous action of hydrochloric acid and an alkaline compound, as aforesaid, the color is not liable to change unless metal is present which is converted into a trichlorid free from any odor of chlorin. Ordinary gold-leaf is dissolved in a minute or two.

The ores or matters to be treated should not contain any hydrochloric-acid-absorbing bases, organic substances, or crude pyrites. Auriferous, argentiferous, and cuprous quartz or earths, calcined, if need be, and well-roasted pyrites may be advantageously treated according to this invention and yield a very large percentage of the metal contained therein, say over ninety per cent.

When solutions of a chlorate or a perchlorate with hydrochloric acid are used, the said solutions may be hot or cold.

The treatment may be effected in filtering troughs or vats sufficiently shallow to complete the filtration of a charge in ten or fifteen minutes. After having been filtered the liquid may be passed to another trough or other troughs as long as the solution remains active. The gold or other metal can be recovered from the solution by any suitable agent—such, for example, as sulfate of iron, organic matter, or sulfurous acid.

I claim—

1. The method herein described of treating ores or other matters containing gold, silver or copper, by forming a weak solution of hydrochloric acid with a small quantity of a compound of an alkali metal or alkali-earth metal, such as permanganate of potash, in such proportions that chlorin is not generated, thereby producing a stable mixture which will dissolve the specified metals in the cold, and treating the ores or metalliferous matters with said mixture, substantially as set forth.

2. The treatment of ores or other matters containing gold, silver or copper, by means of a weak solution of hydrochloric acid in conjunction with a permanganate salt of an alkali metal or earth metal, the said materials being used in such proportion as to produce a liquid free from the odor of chlorin, substantially as described.

3. The treatment of ores or other matters containing gold, silver or copper, by means of a weak solution (about three per cent.) of hydrochloric acid to which is added, while cold, about four hundred grams of permanganate of potash per one thousand kilos of dissolvent, as set forth.

In testimony whereof I have signed my name to this specification in the presence of two subscribing witnesses.

ALEXANDRE ETARD.

Witnesses:
EDWARD P. MACLEAN,
ALBERT MECHLING.